United States Patent Office 3,169,028
Patented Feb. 9, 1965

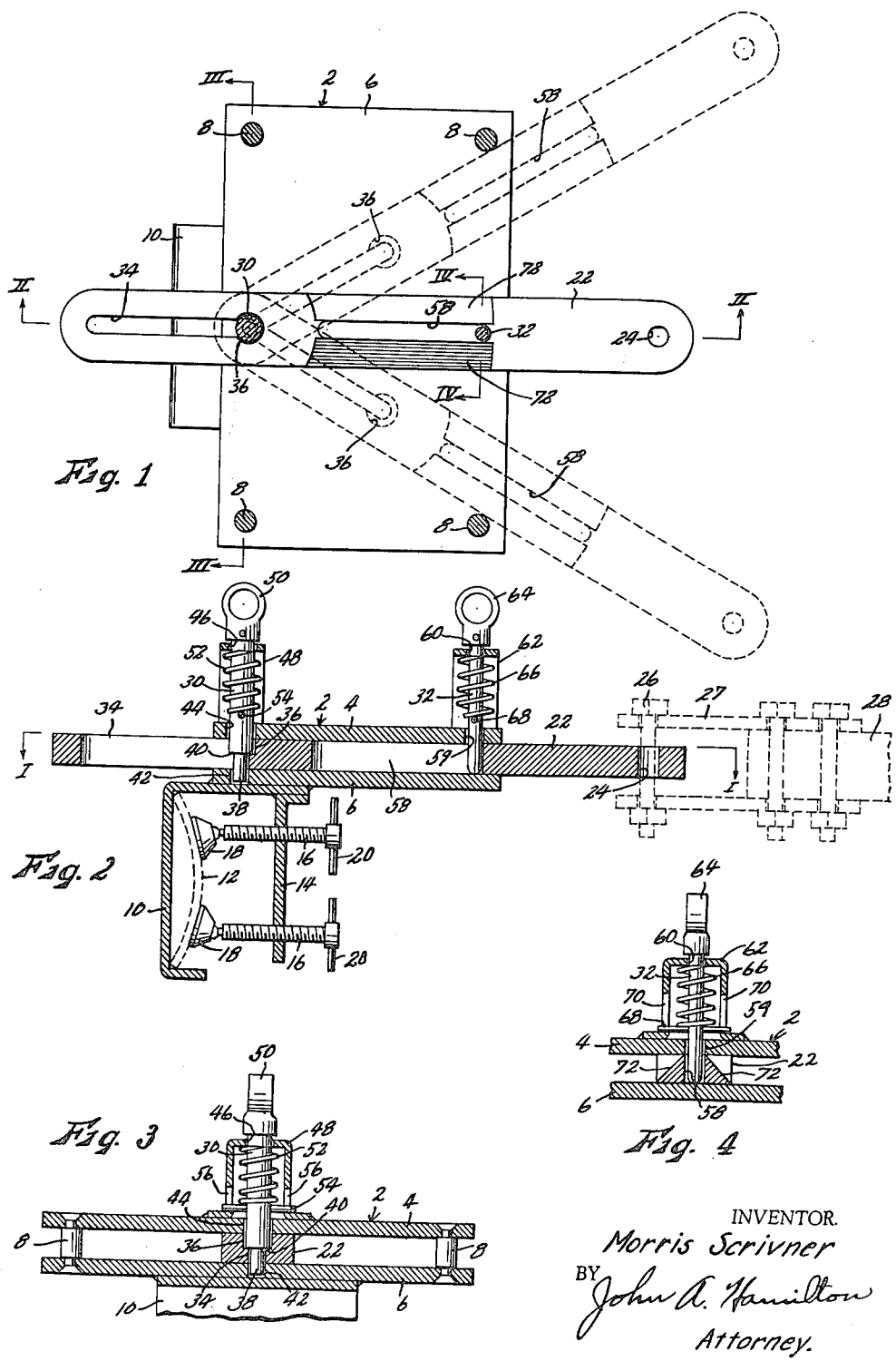

3,169,028
TRAILER HITCH
Morris Scrivner, 2925 Buchanan,
North Kansas City, Mo.
Filed Dec. 3, 1962, Ser. No. 241,649
4 Claims. (Cl. 280—478)

This invention relates to new and useful improvements in trailer hitches, and has particular reference to a hitch adapted to attach farm implements, wagons and the like to trucks, tractors and the like, although it has general application for attaching any sort of trailer to any sort of towing vehicle.

The principal object of the present invention is the provision of a trailer hitch in which the drawbar, carried by the towing vehicle, may be released for free movement both laterally and longitudinally to the draft line, whereby it may be easily moved into exact position to be attached to the vehicle to be towed, and then again aligned properly with and securely locked in proper relation to the towing vehicle, in order that the trailer will trail properly behind the towing vehicle. It is very difficult to maneuver a towing vehicle to move a rigid drawbar carried thereby into exact alignment with the draft element of the trailer to permit connection thereof. The draft element of the trailer may be rigid with respect to the trailer, and even if it is adjustable relative to the trailer, as in the case of a farm wagon having a pivoted draft tongue, the wagon may be so heavily loaded as to make manual pivoting of said tongue very difficult.

Another object is the provision of a trailer hitch of the character described wherein realigning and relocking of the drawbar relative to the towing vehicle, once it has been released and adjusted for attachment to the trailer, is accomplished automatically by normal maneuvering of the towing vehicle.

Other objects are simplicity and economy of construction, efficiency and dependability of operation, and adaptability for use in a wide variety of applications.

With these objects in view, as well as other objects which will appear in the course of the specification, reference will be had to the drawing, wherein:

FIG. 1 is a horizontal sectional view of a trailer hitch embodying the present invention, taken on line I—I of FIG. 2, showing the drawbar in its normal draft position in solid lines, and at the respective limits of its adjustability in dotted lines, FIG. 2 is a vertical midsectional view of the trailer hitch shown in FIG. 1, taken on line II—II of FIG. 1, showing related portions of the towing vehicle and trailer in dotted lines, FIG. 3 is a fragmentary sectional view taken on line III—III of FIG. 1, and FIG. 4 is a fragmentary sectional view taken on line IV—IV of FIG. 1.

Like reference numerals apply to similar parts throughout the several views, and the numeral 2 applies generally to the frame of the trailer hitch, said frame consisting of a pair of horizontal, vertically spaced apart plates 4 and 6, 4 being the upper plate and 6 the lower plate. Said plates are rectangular, and are rigidly connected together adjacent each of their four corners by a rivet 8, as best shown in FIG. 3. A bracket 10 is welded to the lower surface of plate 6, and as shown in FIG. 2, engages the front of the bumper 12 of the towing vehicle. An arm 14 of said bracket has a pair of screws 16 threaded therein, each of said screws having at its forward end a swivel foot 18 adapted to engage the rearward face of bumper 12, and having at its rearward end a handle 20 by means of which it may be turned to clamp the bumper firmly between bracket 10 and swivel feet 18. It will be understood, however, that this attachment clamp is exemplary only, and that any suitable means may be used for attaching frame 2 to the towing vehicle.

Extending forwardly and rearwardly between plates 4 and 6 is a drawbar 22, said drawbar being slidable between said plates. Said drawbar always extends rearwardly from the frame, and has a hole 24 adjacent the rearward end thereof for receiving the clevis bolt 26 of the clevis 27 of tongue 28 of a farm wagon or the like, whereby the drawbar is attached to the wagon, or other vehicle to be towed. It will be understood, however, that this attachment is also only exemplary, and that other draft attachments could be used, such as an upwardly extending ball affixed to the drawbar and adapted to be engaged by an inverted socket carried by the trailer.

Drawbar 22 is releasably affixed between plates 4 and 6 by a forward lock pin 30 carried by frame 2 adjacent the forward edge thereof, and a rearward lock pin 32 carried by frame 2 adjacent the rearward edge thereof. The drawbar is provided adjacent its forward end with a longitudinally elongated slot 34 extending therethrough. Concentrically with the rearward end of said slot, an enlarged socket 36 is formed in the upper surface of the drawbar, but does not extend entirely therethrough. The lower end of forward lock pin 30 fits into socket 36, but is too large to permit slot 34 to pass thereover. Lock pin 30 is provided with a downward axial extension 38 which is of less diameter than slot 34, thereby forming a downwardly facing shoulder 40 at the upper end of said extension. Shoulder 40 normally rests in the base of socket 36, and extension 38 extends downwardly through slot 34 and into a hole 42 provided therefor in plate 6. The pin also extends upwardly through a hole 44 provided therefor in plate 4, then through a hole 46 formed in the connecting portion of an inverted U-shaped bracket 48, and is provided at its upper end with a finger ring 50 by means of which the pin may be elevated manually. The lock pin is urged downwardly by a compression spring 52 disposed thereabout, said spring bearing at its upper end against bracket 48 and at its lower end against a pin 54 inserted transversely through and fixed in the lock pin. Pin 54 extends outwardly from the lock pin, and its end portions are confined in slots 56 formed vertically in bracket 48, whereby to limit the distance the lock pin may be elevated. That is, the lock pin may be raised sufficiently to elevate shoulder 40 thereof above the top surface of the drawbar, but not sufficiently to raise extension 38 to the level of the base of socket 36, for a purpose which will presently be described.

Rearwardly from slot 34, and in alignment therewith, a second slot 58 is formed in the drawbar. Rearward lock pin 32 extends downwardly through a hole 59 provided therefor in plate 4, and into slot 58, being engaged in the rearward end of said slot when forward lock pin 30 is engaged in socket enlargement 36 of slot 34. The lower end of lock pin 32 is hemispherically rounded, and normally rests slidably on the upper surface of plate 6. Above plate 4, lock pin 32 extends upwardly through a hole 60 provided therefor in the connecting portion of an inverted U-shaped bracket 62 welded to plate 4, and has a finger-engaging ring 64 affixed to its upper end, whereby said lock pin may be manually elevated. Said lock pin is biased downwardly by a compression spring 66 disposed thereabout, said spring bearing at its upper end against bracket 62 and at its lower end against a pin 68 inserted transversely through and fixed in the lock pin. The ends of pin 68 extend outwardly from the lock pin, and are disposed in slots 70 formed vertically in bracket 62. Said slots permit lock pin 32 to be elevated sufficiently to raise the lower end thereof above the top surface of drawbar 22. The opposite longitudinal edges of the drawbar are transversely bevelled as shown at 72 in FIGS. 1 and 4, said bevels being inclined upwardly and inwardly from the lower to the upper face of the drawbar adjacent slot 58. Said bevels extend the full length of slot 58, and are in registry therewith.

In use, the operator first backs the towing vehicle to bring the hole 24 of drawbar 22 into approximately correct alignment with clevis 27 of wagon tongue 28. As discussed before, this is very difficult to do with sufficiently absolute accuracy to allow clevis bolt 26 to be dropped into place without adjustment of either the drawbar or the tongue. Even if the wagon tongue is horizontally pivotal, its movement by hand power is often extremely difficult due to heavy loading of the wagon, uneven ground, or other factors. Furthermore, in many possible applications of this invention, the draft element of the trailer vehicle is rigidly affixed to the trailer vehicle, and not adjustable in any direction.

With the present structure, the operator first grasps finger ring 64 of rear lock pin 32 and lifts said pin against the pressure of spring 66 until said pin is elevated above the drawbar. The drawbar may then be pivoted horizontally in either direction, as indicated by the dotted line positions of the drawbar in FIG. 1, using front lock pin 30 as a pivotal axis. When the drawbar has been pivoted as required, the rear lock pin is released and again engages plate 6, but not slot 58 of the drawbar. The pivotal arc of the drawbar is limited by engagement thereof with the two rearward corner rivets 8 of frame 2, as shown in FIG. 1.

If longitudinal adjustment of the drawbar is required, the operator grasps finger ring 50 of front lock pin 30, and elevates said lock pin against spring 52 until shoulder 40 of the lock pin is elevated above the drawbar, whereupon the drawbar may be slid rearwardly, also as indicated by its dotted line positions in FIG. 1. When the lock pin is then released, shoulder 40 thereof rests slidably on the upper surface of the drawbar, but extension 38 of the lock pin is still engaged in slot 34, and cannot be elevated out of the slot due to the limitation of lock pin movement provided by pin 54 and slots 56. Lock pin extension 38 thus locks the drawbar in assembly with frame 2 at all times. It will thus be seen that the rearward end of the drawbar may be freely adjusted to any point in an annular segmental area having an angular extent equal to the maximum pivotal movement of the drawbar on lock pin 30, and a radius equal to the length of slot 34. While the specific dimensions of this area are of course a matter of choice, and could be varied by altering the proportional relationships of the parts, it has been found that by making slot 34 about six inches long, and allowing the drawbar to pivot a total of about 60 degrees, the area of adjustability is entirely adequate in most circumstances.

After the drawbar has been adjusted as necessary, and the draft connection completed as by inserting clevis bolt 26 through clevis 20 and hole 24 of the drawbar, the operator backs the towing vehicle whereby to move frame 2 rearwardly along the drawbar, until lock pin 30 comes over socket enlargement 36 of slot 34, and falls into said socket under the bias of spring 52 until shoulder 40 of the lock pin rests in the base of the socket. Lock pin extension 38 guides the drawbar during this movement. Also, the engagement of said extension in slot 34 keeps the shoulder centered with respect to the socket when the pin reaches said socket in order that the shoulder will not engage the top of the drawbar adjacent the socket and be prevented thereby from entering the socket. The limitation of the pivotal movement of the drawbar by the rearward frame rivets 8 is necessary to prevent jack-knifing of the drawbar as the towing vehicle is backed, under certain conditions when the midline of the towing vehicle and the midline of the trailer are disposed at extreme angles to each other.

The operator then moves the towing vehicle forwardly, it being apparent that since lock pin 30 is engaged in socket 36, the drawbar cannot move rearwardly with respect to the lock pin, and the trailer will be drawn forwardly. Lock pin 30 thus supports the entire draft load of the hitch. The drawbar is still free to pivot on lock pin 30 at this time, but as the towing vehicle moves forwardly the drawbar tends to pivot to its center position shown in solid lines in FIG. 1, in response either to the normal process of the trailer coming into alignment with the towing vehicle, or in response to maneuvering of the towing vehicle specifically for this purpose. As said drawbar approaches this centered position, one or the other of the bevelled surfaces 72 thereof engages the rounded lower end of rear lock pin 32, camming said rear lock pin upwardly against spring 66, until slot 58 comes into alignment with said lock pin and said lock pin falls therein. The drawbar is then locked in a fixed position with respect to frame 2 and the towing vehicle, and the hitch connection is complete. The fixed relationship of the drawbar to frame 2 is necessary both to insure proper trailing of the trailer behind the towing vehicle and to prevent jack-knifing of the drawbar when the trailer moves forwardly against the towing vehicle, as when the brakes of the towing vehicle are applied.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. A trailer hitch comprising:
   (a) a frame,
   (b) means for attaching said frame rigidly to a towing vehicle,
   (c) an elongated drawbar carried by said frame and extending horizontally forwardly and rearwardly with respect to the draft line of said hitch, said drawbar being both longitudinally and transversely movable with respect to said frame and having first and second elongated slots formed vertically therethrough in longitudially spaced apart relation, said drawbar extending rearwardly from said frame and being adapted to be connected at its rearward end to a trailer vehicle,
   (d) a first vertical lock pin carried movably by said frame for vertical movement and engaging in said first slot to permit longitudinal movement of said drawbar and horizontal pivoting of said drawbar about said lock pin, said first lock pin and said first slot having cooperating surfaces which, in one position of said first lock pin, secures said drawbar against longitudinal movement, and
   (e) a second vertical lock pin carried by said frame for vertical movement into and out of said second slot, whereby when engaged in said second slot to permit longitudinal movement of said drawbar but to prevent pivotal movement of said drawbar about said first lock pin.

2. A trailer hitch as recited in claim 1 wherein said first lock pin moves downwardly to engage in said first drawbar slot, and wherein said drawbar has a circular recess formed in the upper surface thereof concentrically with one end of said slot, the diameter of said recess being greater than the width of said slot, said first lock pin having a larger upper portion adapted to engage a base portion of said recess but having a diameter greater than the width of the slot, and a downward axial extension of reduced diameter engaging slidably in said slot.

3. A trailer hitch as recited in claim 2 with the addition of:
   (a) stop means limiting the upward movement of said first lock pin to a position in which the larger upper portion thereof is elevated above the upper surface of said drawbar, but wherein the lower portion of the reduced downward extension thereof extends below the level of the base portion of said recess.

4. A trailer hitch as recited in claim 3 wherein said second lock pin is vertically disposed and moves downwardly to engage in said second drawbar slot, and wherein the longitudinal edges of said drawbar adjacent said second slot are vertically bevelled, and with the addition of:

(a) resilient means biasing said second lock pin downwardly, whereby when said drawbar is pivoted to bring said second slot toward alignment with said ssecond lock pin, one or the other of the bevelled edges of said drawbar will engage and cam said second lock pin upwardly to allow it to enter said second slot.

References Cited in the file of this patent
UNITED STATES PATENTS

| 1,422,189 | Eckertz | July 11, 1922 |
| 2,898,126 | Loukonen | Aug. 4, 1959 |
| 3,093,395 | Boutwell | June 11, 1963 |

FOREIGN PATENTS

| 388,628 | Great Britain | Mar. 2, 1933 |